March 22, 1949. O. H. FLEMING 2,465,217
FAN BELT TOOL
Filed Aug. 30, 1944
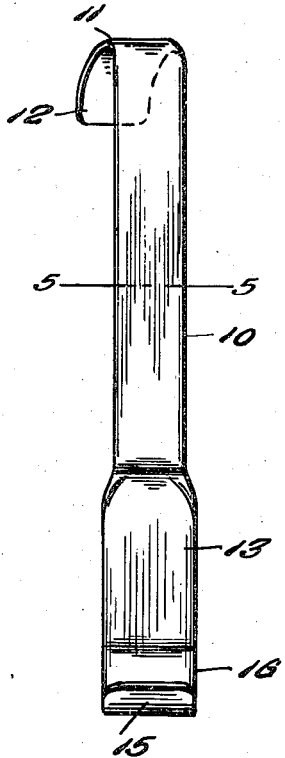
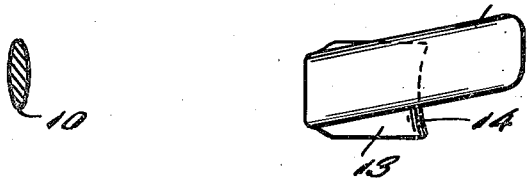
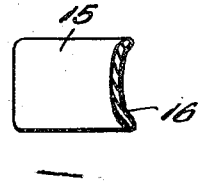
Inventor
Orie H. Fleming
By Clarence A. O'Brien
and Harvey B. Jackson
Attorneys Patented Mar. 22, 1949

2,465,217

UNITED STATES PATENT OFFICE 2,465,217

FAN BELT TOOL

Orie H. Fleming, Worthington, W. Va.

Application August 30, 1944, Serial No. 551,973

1 Claim. (Cl. 74—242.7)

This invention relates to a fan belt tool and more particularly to such a tool adapted to be utilized in the installation of a fan belt in a motor vehicle.

A primary object of this invention is the provision of an improved fan belt tool adapted to facilitate and speed up the installation of new fan belts in a motor vehicle.

An additional object is the provision of such a tool which will insure a relatively safe installation of such a belt, precluding the possibility of scraping the knuckles or otherwise injuring the hands or fingers.

Still another object of the invention is the provision of such a tool so designed as to preclude the possibility of injury of the fan belt in the installation thereof.

As conducive to a clearer understanding of this invention it may here be pointed out that in the installation of a belt in a motor vehicle according to the present procedure the belt is first secured about the pulley of a drive shaft and then about the pulley of the fan, and subsequently hooked or otherwise secured over the pulley on the generator. The belts are normally preformed in a variety of sizes to accommodate a variety of installations to various makes of cars, and so designed as to provide a right fit around the three pulleys above mentioned. Customarily the generator is located in a relatively inaccessible position, with the result that hitherto the fan belt has had to be hooked over the pulley thereof by hand in a relatively congested small area, this operation has been frequently difficult, since material force sometime has to be exerted to secure the belt over the pulley of the generator, and frequently bruised or skinned knuckles have resulted to the installer thereof. Furthermore, such operation is dangerous in that should the starter of the vehicle be accidentally energized during the time the hands are in juxtaposition to the fan belt, serious injury may be occasioned by the rotation of the fan blades. It is an important object of this invention, therefore, to obviate the above mentioned difficulties and others, all as will be more fully pointed out hereinafter and disclosed in the accompanying drawings, wherein there is shown a preferred embodiment of this inventive concept.

In the drawings—

Figure 1 is a front plan view partly in perspective, certain parts thereof being shown in dotted lines.

Figure 2 is a side elevational view of the device shown in Figure 1.

Figure 3 is an end elevational view of the device as viewed from the top of Figures 1 and 2.

Figure 4 is a sectional view taken substantially along the line 4—4 of Figure 2, and Figure 5 is a sectional view taken substantially along the line 5—5 of Figure 1.

Like reference numerals refer to like parts throughout the several views of the drawings.

Having reference now to the drawings it will be seen that the tool of the instant invention is comprised of a shank portion 10, substantially oblate in cross-section, as shown in Figure 5, and bent at one end as at 11 to form a handle portion 12, handle portion 12 being bent inwardly with respect to shank 10 to form an acute angle therewith, slightly less than a right angle. The opposite end of shank 10 merges into an obtusely angled portion 13, of concavo-convex cross section, as best shown in Figure 3, the concavity being designated by the reference character 14. Portion 13 terminates in a hook 15 bent to form a crotch 16, the cross sectional portion of crotch 16 being concavo convex, as best shown in Figure 4, while the hook itself is similar in cross sectional configuration to the shank 10.

From the foregoing the operation of the device should now be readily understandable. When it is desired to install a fan belt, the belt is first looped about the pulleys on the drive shaft and the fan shaft of a motor, and secured in the crotch 16 of hook 15. The convexed portion of crotch 16 being in abutting relation with the belt, damage to the belt by sharp edges or the like of the tool is substantially precluded. The handle portion 12 is then securely grasped and the belt pulled over and into alignment with the flywheel pulley. The hook 15 is now disengaged from the belt, and the same is permitted to settle in the groove of the flywheel.

If an exceptionally tight fit occurs and it is difficult to disengage the tool from the belt it will be readily understood that a slight movement of the belt and associated pulleys, as by movement of the fan blades, will displace the tool with respect to the pulley on the flywheel and permit the belt to settle into the associated groove.

From the foregoing it will now be seen that there is provided a device accomplishing all the objects of this invention and others including many advantages of great practical utility and commercial importance.

As many embodiments may be made of this inventive concept, and as many modifications may be made in the embodiment hereinbefore shown and described, it will be understood that

I claim:

In a fan belt tool, a flat shank, a hook shape handle formed at an extremity of said shank and being laterally offset and acutely angled with respect thereto, an obtusely angled extending portion at the other end of said shank, and a portion of said obtusely angled portion bent at substantially right angles to said shank to form a hook, a crotch having a flattened belt supporting seat formed between the obtusely angled portion and the hook end of said tool, said shank and said handle being oblate in cross section and said obtusely angled portion and said hook being convex with respect to the interior of said hook.

ORIE H. FLEMING.

REFERENCES CITED

The following references are of record in the file of this patent:

UNITED STATES PATENTS

| Number | Name | Date |
|---|---|---|
| 1,666,789 | Pobanz | Apr. 17, 1928 |
| 2,121,129 | Malone | June 21, 1938 |